United States Patent
Miralles

[11] Patent Number: 6,018,903
[45] Date of Patent: Feb. 1, 2000

[54] APPARATUS FOR TRANSPORTING A FISHING LINE

[76] Inventor: Gary Miralles, 15164 Bear Mountain Rd., Redding, Calif. 96003

[21] Appl. No.: 09/189,476

[22] Filed: Nov. 10, 1998

[51] Int. Cl.[7] .................................................. A01K 91/08
[52] U.S. Cl. ........................................ 43/43.12; 43/43.13
[58] Field of Search ................................. 43/43.12, 43.13

[56] References Cited

U.S. PATENT DOCUMENTS

| | | | |
|---|---|---|---|
| 2,235,868 | 3/1941 | Coolidge et al. | 43/43.13 |
| 2,322,241 | 6/1943 | Kurz | 43/43.13 |
| 2,566,029 | 8/1951 | Louthan | 43/43.13 |
| 3,613,290 | 10/1971 | Louthan | 43/43.13 |
| 3,667,148 | 6/1972 | Dawson | 43/43.13 |
| 3,708,904 | 1/1973 | Zaharis | 43/43.13 |
| 3,816,954 | 6/1974 | Bissonette | 43/43.12 |
| 3,835,573 | 9/1974 | Borchardt | 43/43.12 |
| 3,925,920 | 12/1975 | Walker | 43/43.12 |
| 4,028,839 | 6/1977 | Stubblefield | 43/43.13 |
| 4,069,611 | 1/1978 | Dusich et al. | 43/43.12 |
| 4,079,539 | 3/1978 | Holstein | 43/43.13 |
| 4,161,841 | 7/1979 | Holstein | 43/43.13 |
| 4,212,127 | 7/1980 | Daniels | 43/43.12 |
| 4,221,068 | 9/1980 | Roemer, Jr. | 43/43.12 |
| 4,254,573 | 3/1981 | Mastropaolo | 43/43.13 |
| 4,255,890 | 3/1981 | Smith | 43/43.12 |
| 4,282,672 | 8/1981 | Neary | 43/43.13 |
| 4,567,687 | 2/1986 | Even et al. | 43/43.13 |
| 4,813,172 | 3/1989 | McCue | 43/43.12 |
| 4,905,401 | 3/1990 | Fukumoto | 43/43.12 |
| 4,922,648 | 5/1990 | Louthan | 43/43.13 |
| 4,942,690 | 7/1990 | Lund | 43/42.12 |
| 5,020,268 | 6/1991 | Combs, III | 43/43.13 |
| 5,189,828 | 3/1993 | Summers | 43/43.12 |
| 5,276,994 | 1/1994 | Thompson et al. | 43/43.13 |

FOREIGN PATENT DOCUMENTS

| | | | |
|---|---|---|---|
| 1344477 | 10/1963 | France | 43/43.13 |

Primary Examiner—Michael J. Carone
Assistant Examiner—Darren W. Ark
Attorney, Agent, or Firm—Thomas R. Lampe

[57] ABSTRACT

Apparatus for transporting a fishing line to a position under the surface of a body of water includes a diving plane slidably connected to a guide line. The plane can be tilted between two positions to move the diving plane up or down the guide line. A movable weight on the diving plane stabilizes the diving plane in the desired tilted position and increases the angle of tilt of the diving plane when the diving plane slides up the guide line.

10 Claims, 4 Drawing Sheets

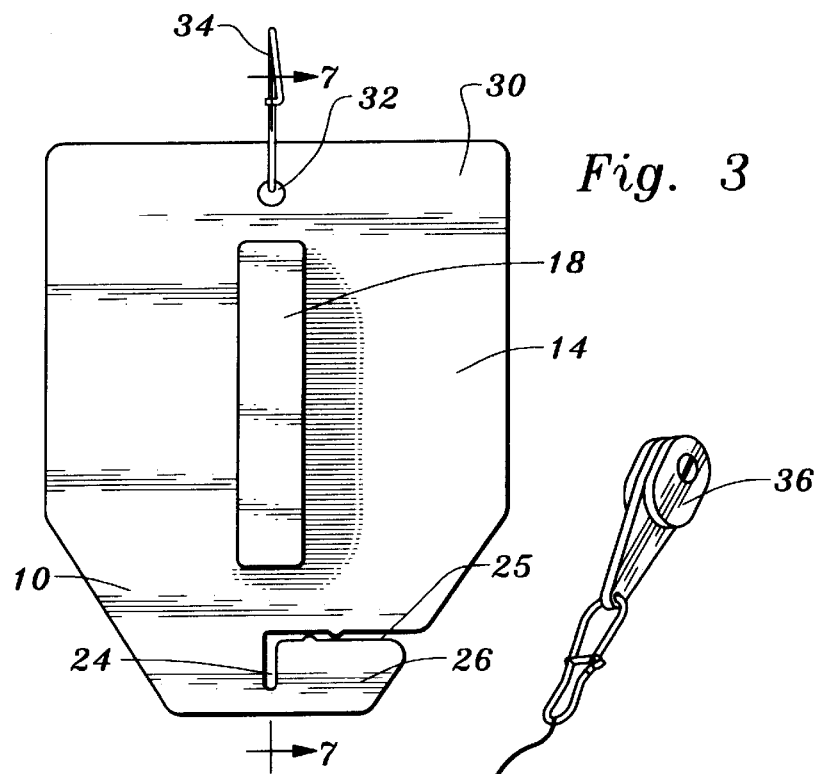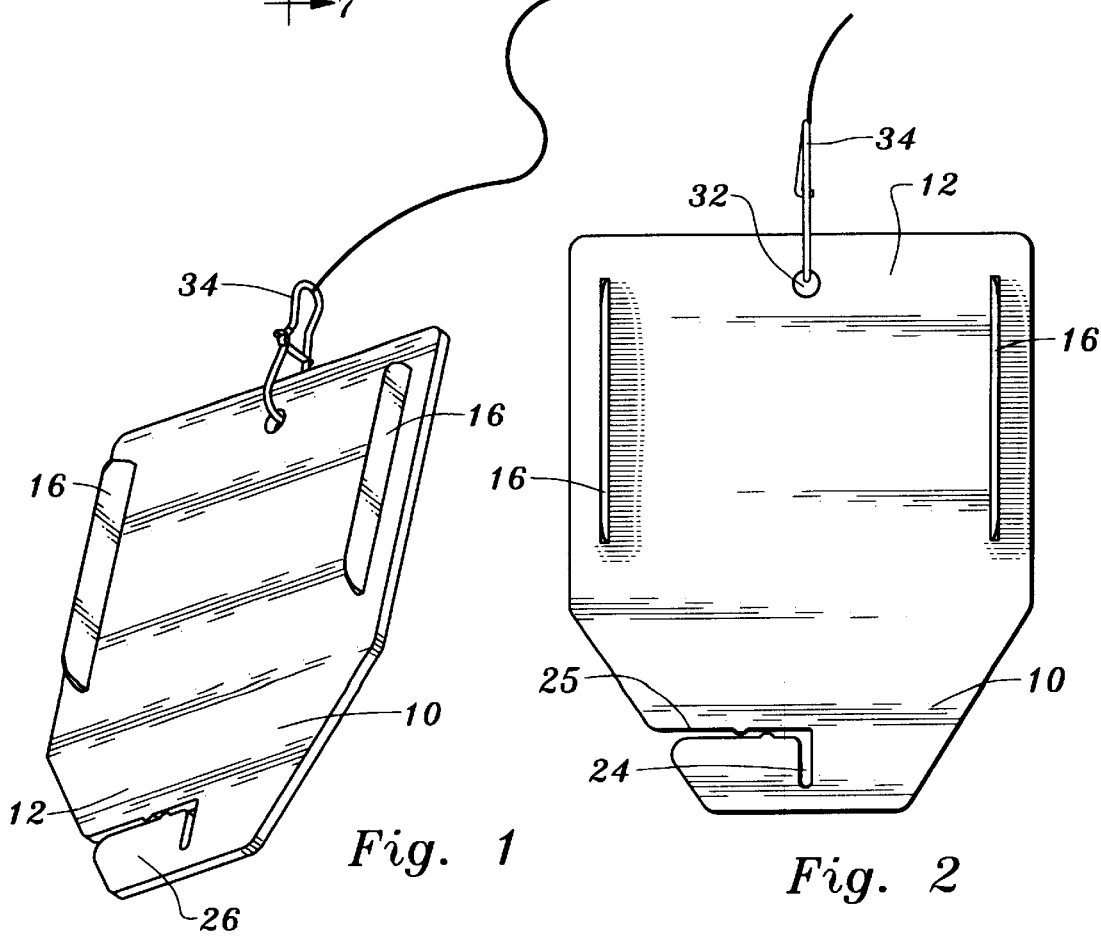

APPARATUS FOR TRANSPORTING A FISHING LINE

TECHNICAL FIELD

The invention relates to downrigger fishing apparatus incorporating a downrigger diving plane which carries a fishing line to a predetermined depth and returns to the surface automatically when actuated by a fisherman.

BACKGROUND OF THE INVENTION

Downrigger fishing is a method used to catch fish that swim at great depths underwater. A downrigger weight is attached to a line or cable and suspended from a fishing vessel to a predetermined depth. Conventionally fishing lures or baited hooks are attached to the cable along the length of the downrigger at depth locations where it is suspected fish will be located.

The downrigger cable and weight maintain fishing lines attached thereto at the preselected depths and when a fish is caught the associated line is released from the downrigger and brought to the surface. Examples of prior art relating to downrigger devices are disclosed in U.S. Pat. No. 4,942,690 to Lund, U.S. Pat. No. 4,922,648 to Louthan, U.S. Pat. No. 5,276,994 to Thompson et al., U.S. Pat. No. 3,925,920 to Walker, U.S. Pat. No. 3,816,954 to Bissonette, and U.S. Pat. No. 4,212,127 to Daniels.

DISCLOSURE OF INVENTION

The present invention relates to apparatus including a diving plane that is attached between a downrigger weighted guide line or cable and a fishing line by means of a downrigger release. Structurally, the downrigger diving plane has a flat, planar streamlined shape including an elongated opening or slot for slidably receiving a downrigger cable and a hole on the rear portion of the plane for attachment to a release line.

The bottom of the downrigger plane has attached thereto an elongated housing or chamber extending longitudinally in a front to rear direction, which contains a weight member located within the chamber whereby the weight member is freely movable from a front to a rear position depending upon the angle of attachment of the plane to the cable. When the plane is angled upwardly from the guide line or cable the weight rolls to the front causing the downrigger plane to move downwardly on the cable. When the downrigger plane is released from its associated fishing line, the rear portion of the diving plane angles downwardly, causing the weight to roll rearwardly whereby the direction of plane travel, after release, is in the upward direction. The weight stabilizes the diving plane in the desired tilted position and contributes to the performance and reliability of the apparatus.

Tension on the fishing line keeps the hydrodynamic downrigger plane disposed in a downward angle in the direction of the guide line to which it is connected. Water flowing over the diving plane forces it down the cable to a preselected position defined by a downrigger stop or by the cable weight. After a fish strikes, or the diving plane is released manually from the line, the water pushing against the diving plane forces it to tip upwardly in the direction of the guide line. This in turn influences the weight in the chamber and causes it to roll from the front to the back of the chamber, resulting in an increase in the upward angle as water flows under the plane, pushing it up toward the surface. Fins on top of the downrigger fishing plane work to stabilize the plane.

Among the objects of the present invention is the provision of a downrigger device for locating a fishing line and hook or lure at a specific depth or location along a downrigger cable or guide line.

Another object of the present invention is the provision of a downrigger device which releases the fishing line when a fish is hooked, allowing the device to automatically return to the surface after the line is released. The weight member shift helps to retain the diving plane at the desired tilted position and provides an increased angle of tilt so that the apparatus reliably and quickly reaches the water surface regardless of external conditions.

Still another object of the present invention is the provision of a downrigger line that is controlled by a fisherman at the surface so that the precise depth of the fishing hook can be controlled.

Other features, advantages, and objects of the present invention will become apparent with reference to the following description and accompanying drawings.

BRIEF DESCRIPTION OF DRAWINGS

FIG. 1 is a top perspective view of apparatus constructed in accordance with the teachings of the present invention;

FIG. 2 is a top plan view of the apparatus;

FIG. 3 is a bottom view of the apparatus;

BEST MODE FOR CARRYING OUT THE INVENTION

Figure 4:
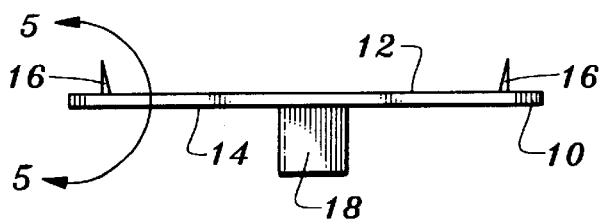
FIG. 4 is a rear view of the diving plane and housing and fins attached to the diving plane.
Figure 5:
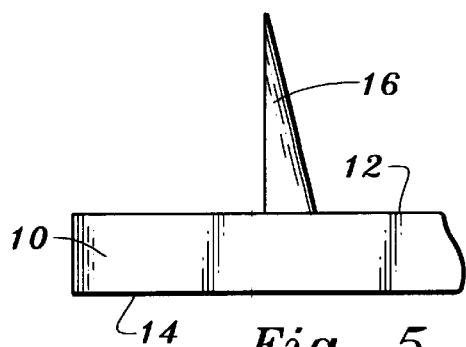
FIG. 5 is an enlarged view of that portion of the apparatus designated by line 5—5 in FIG. 4.
Figure 6:
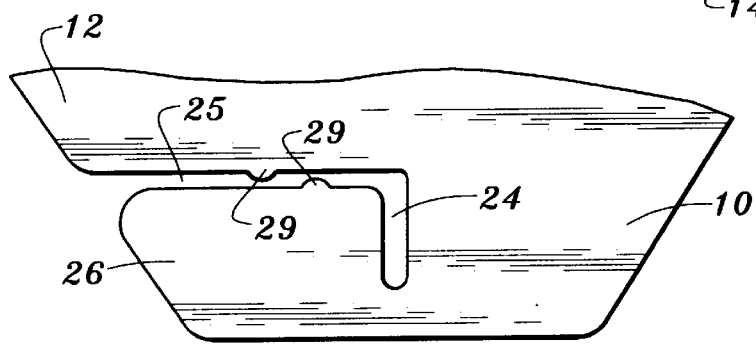
FIG. 6 is an enlarged top view of a portion of the diving plane defining an opening for receiving a weighted guide line.

Referring to the drawings, the apparatus of the present invention includes a diving plane 10 formed of a generally flat sheet of material, preferably plastic or other similar light weight material. The plane 10 includes an upper surface 12 and lower surface 14. Fins 16 project from upper surface 12 and stabilize the hydrodynamic plane as it moves through the water when towed by a boat. A housing 18 projects from lower surface 16 defining a double-ended, elongated interior or cavity 20 extending from front to rear and containing a weight in the form of a ball 22 formed from metal or other suitable material. The housing is waterproof and the housing interior isolated from the body of water and not in communication therewith whereby movement of the weight will not be impeded by water in the housing interior.

The front or leading portion of the diving plane 10 includes an elongated opening 24 and a passageway 25 connected orthogonally thereto and extending to an edge of the plane. The opening and passageway define a flexible tab 26 in the diving plane which may be flexed to allow passage through the passageway of a cable or guide line 28 for placement in the opening. Projections 29 in the passageway prevent inadvertent separation of the cable from the plane.

The downrigger diving plane 10 moves freely upwardly and downwardly along the cable 28 without undue friction and in response to movement of the water across the flat planar surfaces of the plane 10. A weight 30 keeps the cable or guide line taut.

A rear portion of the diving plane 10 includes an opening 32 for attachment of a fishing line holder 34 having a release 36 connected to a fishing line 38 at a point near or adjacent to a lure 40 or baited hook. In order to properly locate the fishing lure 40, the cable 28 is provided with a stop member 44 located a predetermined distance along the length thereof.

The operation of the apparatus is as follows. A stop member 44 is attached to the cable 28. The downrigger weight 31 is then lowered to a desired depth. While loosening the drag on a reel on a fishing pole (not shown) at the surface, the release 36 (which may be of any suitable commercially available type such as the adjustable clamp-type illustrated which is sold under the brand name Shasta Ultra Release by Shasta Tackle Co. of Bella Vista, Calif.) is attached to downrigger plane 10 by fishing line holder 34.

Figure 7:
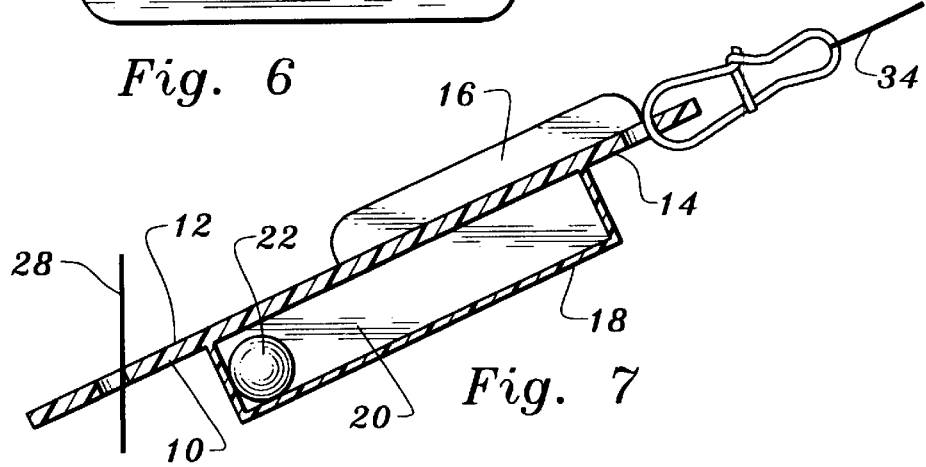
FIG. 7 is an enlarged cross-sectional view of the apparatus taken along line 7—7 of FIG. 3 illustrating the diving plane tilted for descent along a guide line.
Figure 9:
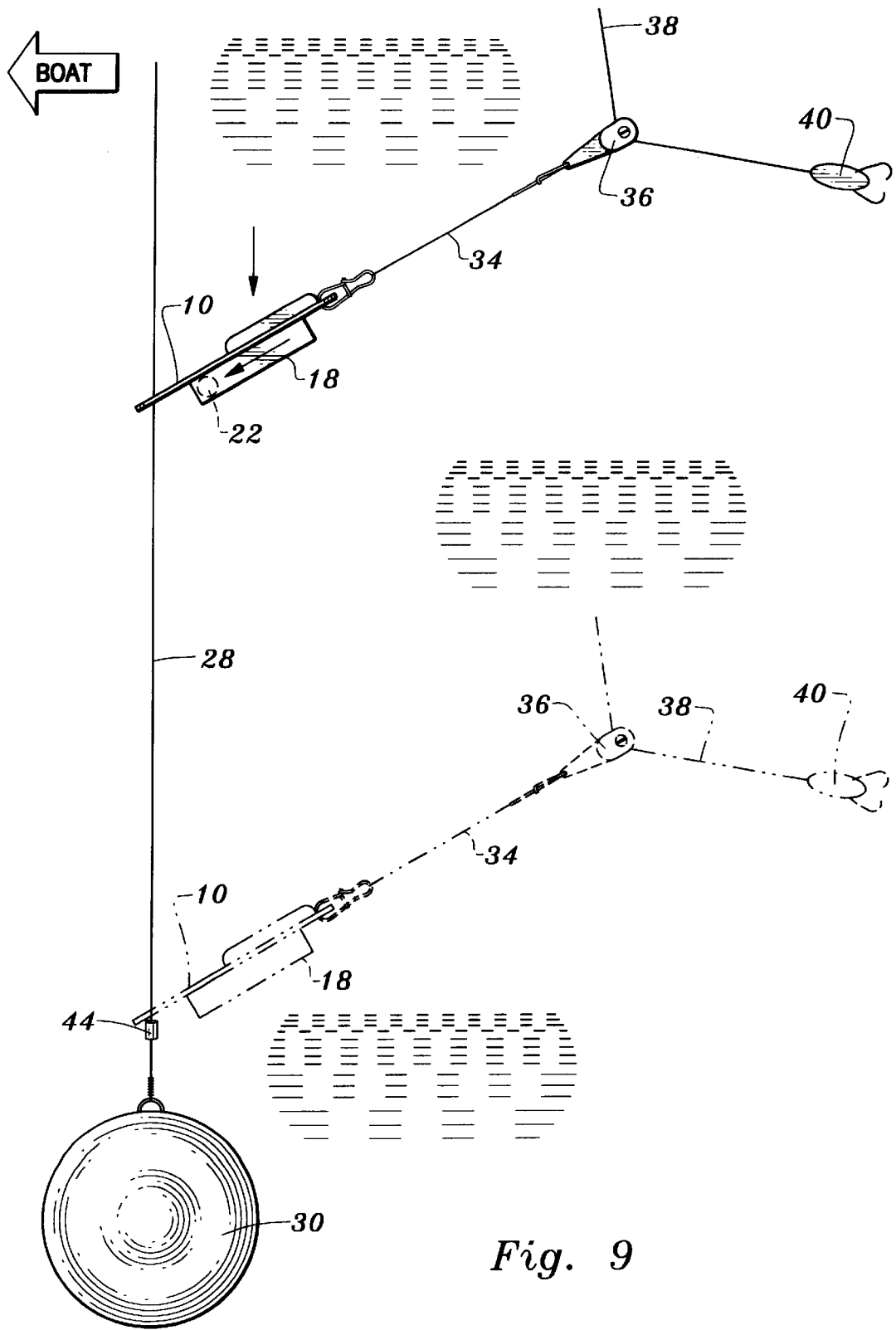
FIG. 9 is a schematic view illustrating the apparatus connected to a guide line and fishing line and descending the guide line.

While holding the plane 10, the tab 26 is pushed downwardly, preferably by the fisherman's thumb, and the cable 28 is then slid through passageway 25 into opening 24. The fishing line 38 is attached to the release and the downrigger or diving plane 10 is lowered into the water, maintaining tension on the fishing line at all times. The tension is maintained until the plane 10 reaches the stop 44, allowing the fisherman to reset the drag. The hydrodynamic plane 10 dives when tension is placed on the fishing line by movement of the water against the plane 10 causing the plane to tilt and rearward portion thereof to be maintained in an upward position. This causes the weight to roll to the front end of the housing interior, stabilizing the plane and helping keep it in position as it moves downwardly on the cable as shown in FIGS. 7 and 9.

As the diving plane 10 is trolled or pulled through the water, the action of the water on the planar surfaces thereof causes the plane to dive and it will continue to do so as long as a tension is kept on the fishing line. This is readily done by the fisherman setting a drag on the fishing reel to provide a light resistance to the line as it is unreeled.

Figure 8:
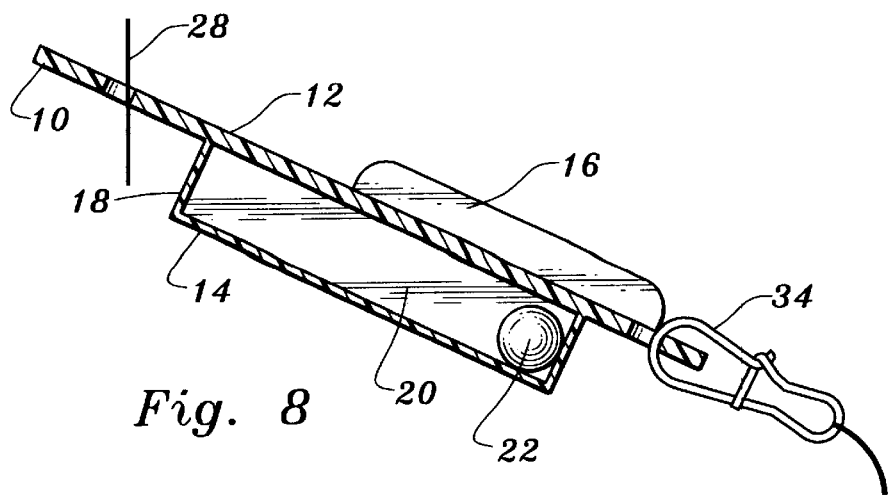
FIG. 8 is a view similar to FIG. 7 but illustrating the diving plane tilted for ascent along a guide line.
Figure 10:
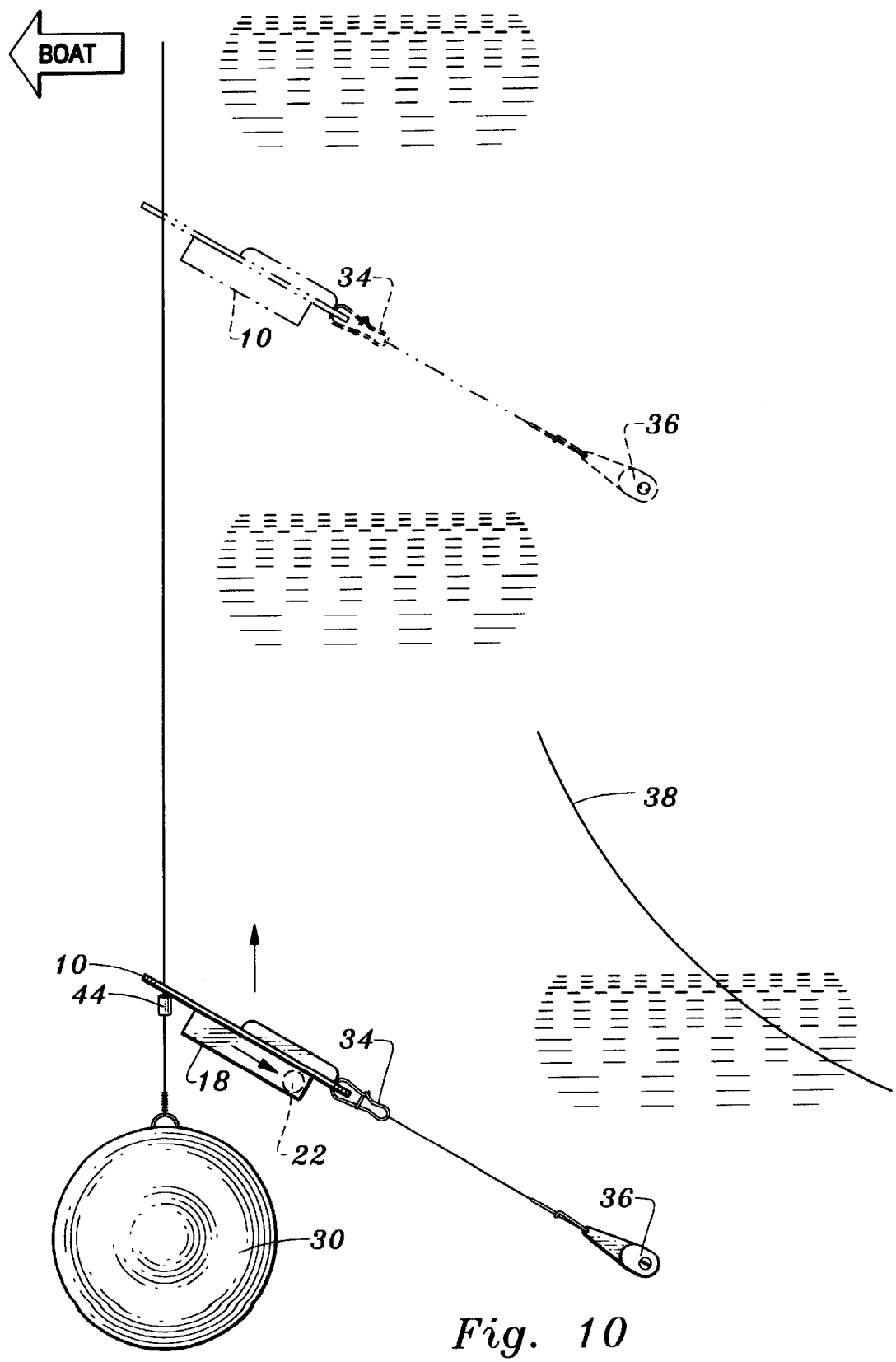
FIG. 10 is a view similar to FIG. 9 illustrating the apparatus disconnected from the fishing line and ascending the guide line.

When the downrigger plane 10 reaches the end of the downrigger cable or a specifically located stop 44, the downrigger plane and the fishing line with the lure or bait attached thereto is then at the desired depth for trolling. Maintaining the slight tension on the line keeps the rear end of the plane in its upward position until a fish bites the baited hook or lure. When the fish engages the lure the release actuates and the plane separates from the fishing line as shown in FIG. 10. This causes the plane to rotate downwardly relative to the guide line which in turn causes the weight within the chamber to roll toward the rearward portion as shown in FIGS. 8 and 10. Continued movement of the downrigger cable through the water causes movement of the water against the bottom of the downrigger plane to force it in an upward direction along the guide line until it reaches the top surface, the weight resisting any tendency of the diving plane to be inadvertently displaced to its down planing orientation. Since the fishing line is released once a fish is on the hook, there is no additional weight or drag caused by the downrigger plane on the fishing line.

The downrigger plane may be brought to the surface with the fishing line still attached by simply relaxing the tension on the fishing line which causes the plane to tilt to an up planing position. Once the plane reaches the upper surface the fisherman can check the bait, clean the lines and perform any other maintenance necessary. In order to return the downrigger plane back to the fishing depth the fisherman simply positions the downrigger plane to its downward planing position by adding a bit of tension to the fishing line causing the plane to return to the desired location toward the end of the cable.

I claim:

1. Apparatus for transporting a fishing line to a position under the surface of a body of water along a weighted guide line in said body of water, said apparatus comprising, in combination:

a diving plane for slidable connection to the weighted guide line at a first location on said diving plane, said diving plane tiltable relative to said guide line between a first tilted position wherein said diving plane is moved downwardly along said weighted guide line by the force of water when said diving plane and weighted guide line move through the water and a second tilted position wherein said diving plane is moved upwardly along said weighted guide line by the force of water when said diving plane and said weighted guide line move through the water;

releasable connector means for releasably connecting said diving plane to a fishing line when said diving plane is slidably connected to said weighted guide line, said releasable connector means being connected to said diving plane at a second location on said diving plane spaced from said first location, an application of force on said diving plane by said releasable connector means maintaining said diving plane in said first tilted position and said diving plane tilting relative to said weighted guide line to said second tilted position when said releasable connector means releases said diving plane from said fishing line; and a weight movably connected to said diving plane and movable toward said first location when said diving plane is tilted relative to said weighted guide line to said first tilted position by said releasable connector means and movable away from said first location toward said second location when said diving plane is tilted relative to said weighted guide line from said first tilted position to said second tilted position.

2. The apparatus according to claim 1 additionally comprising a housing having a double-ended interior attached to said diving plane, said weight being confined in said housing interior and movable therein between the ends thereof.

3. The apparatus according to claim 2 wherein said weight comprises a weight member having a circular outer peripheral surface for rolling within said housing interior.

4. The apparatus according to claim 3 wherein said weight member comprises a ball.

5. The apparatus according to claim 2 wherein said housing is water proof and the housing interior maintained isolated from said body of water and not in communication therewith whereby movement of said weight will not be impeded by water entering the housing interior from said body of water.

6. The apparatus according to claim 1 wherein said diving plane defines an opening for slidably accommodating said weighted guide line.

7. The apparatus according to claim 6 wherein said diving plane has an outer edge and additionally defines a passageway leading from said edge to said opening to allow positioning of said weighted guide line in said opening.

8. The apparatus according to claim 7 wherein said diving plane includes a resilient diving plane element resiliently attached to the remainder of said diving plane and movable relative thereto upon the application of an outside force to the diving plane element to temporarily increase the size of said passageway to facilitate passage of the weighted guide line therethrough.

9. The apparatus according to claim 7 wherein said diving plane includes at least one projection projecting into said passageway.

10. The apparatus according to claim 7 wherein said opening and said passageway are each elongated and are substantially orthogonal with respect to one another.

* * * * *